US010999514B2

(12) United States Patent
von Fintel et al.

(10) Patent No.: US 10,999,514 B2
(45) Date of Patent: May 4, 2021

(54) DIGITAL CAMERA

(71) Applicant: Carl Zeiss AG, Oberkochen (DE)

(72) Inventors: Aaron von Fintel, Berlin (DE); Dominik Meier, Munich (DE); Franziska Haas, Oberschleißheim (DE); Alexander Peters, Munich (DE); Julia Raith, Munich (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 16/665,545

(22) Filed: Oct. 28, 2019

(65) Prior Publication Data
US 2020/0068137 A1 Feb. 27, 2020

Related U.S. Application Data

(63) Continuation of application No. PCT/EP2018/060482, filed on Apr. 24, 2018.

(30) Foreign Application Priority Data

Apr. 28, 2017 (DE) ............ 10 2017 109 254.4

(51) Int. Cl.
*H04N 5/232* (2006.01)
*H04N 5/225* (2006.01)

(52) U.S. Cl.
CPC ... *H04N 5/232933* (2018.08); *H04N 5/22525* (2018.08); *H04N 5/23216* (2013.01); *H04N 5/232939* (2018.08)

(58) Field of Classification Search
CPC ............ H04N 5/2252; H04N 5/22525; H04N 5/23216; H04N 5/23293; H04N 5/232933; H04N 5/232939
See application file for complete search history.

(56) References Cited

U.S. PATENT DOCUMENTS

| 8,416,333 B2 | 4/2013 | Nakai et al. |
| 9,232,144 B2 | 1/2016 | Kino |
(Continued)

FOREIGN PATENT DOCUMENTS

| CN | 102006417 A | 4/2011 |
| CN | 104469134 A | 3/2015 |
(Continued)

OTHER PUBLICATIONS

International Search Report and Written Opinion of the European Patent Office in PCT/EP2018/060482 (from which this application claims priority) dated Jun. 26, 2018.
(Continued)

*Primary Examiner* — Amy R Hsu
(74) *Attorney, Agent, or Firm* — Falk Ewers; Ewers IP Law PLLC

(57) ABSTRACT

A digital camera has an electronic image sensor and an electronic viewfinder, which is configured to display images and/or videos acquired by the image sensor. The digital camera additionally has a display screen, which is also configured to display images and/or videos acquired by the image sensor. The display screen, which is independent of the electronic viewfinder and which is bounded by a circumferential border, has a touch-sensitive surface, wherein a touch of the surface is recognizable in the electronic viewfinder. A haptically perceptible structure, which is located inside the circumferential border, is configured such that a finger of a user can orient itself on the structure. The surface of the display screen has two planar sections which are arranged inclined in relation to one another. The haptically perceptible structure is formed as a buckled edge, at which the two sections adjoin one another.

11 Claims, 6 Drawing Sheets

(56) References Cited

U.S. PATENT DOCUMENTS

| | | | | |
|---|---|---|---|---|
| 2004/0196399 | A1* | 10/2004 | Stavely | H04N 5/23219 348/333.01 |
| 2014/0375864 | A1* | 12/2014 | Miyagishima | G03B 13/02 348/333.09 |
| 2015/0172551 | A1* | 6/2015 | Irie | H04N 5/232945 348/333.02 |
| 2016/0309069 | A1* | 10/2016 | Steinberg | H04N 5/2257 |
| 2016/0309092 | A1* | 10/2016 | Feinberg | H04N 5/2252 |
| 2018/0130855 | A1* | 5/2018 | Seo | H01L 51/0054 |

FOREIGN PATENT DOCUMENTS

| | | |
|---|---|---|
| DE | 102011012838 A1 | 9/2012 |
| DE | 102011120265 A1 | 6/2013 |
| DE | 202014006401 U1 | 10/2014 |
| DE | 102014011164 A1 | 1/2016 |
| DE | 112015003690 T5 | 4/2017 |
| JP | 2012089973 A | 5/2012 |
| JP | 2013105356 A | 5/2013 |
| JP | 2013162412 A | 8/2013 |
| JP | 2016054353 A | 4/2016 |
| JP | 2016208196 A | 12/2016 |
| WO | 2016012464 A1 | 1/2016 |

OTHER PUBLICATIONS

Office Action dated Aug. 10, 2020 issued in Chinese counterpart application No. 201880026356.9 and English-language Office Action Summary thereof.

Office Action of the German Patent and Trademark Office dated Dec. 7, 2017 (Priority Application No. DE 10 2017 109 254.4) and English-language translation thereof.

Office Action dated Oct. 27, 2020 issued in Japanese counterpart application No. 2019-555567 and English-language translation thereof.

* cited by examiner

DIGITAL CAMERA

CROSS REFERENCE TO RELATED APPLICATIONS

This application is a continuation application of international patent application PCT/EP2018/060482, filed Apr. 24, 2018, designating the United States and claiming priority to German application 10 2017 109 254.4, filed Apr. 28, 2017, and the entire content of both applications is incorporated herein by reference.

TECHNICAL FIELD

The disclosure relates to a digital camera for recording photos and/or videos having an electronic viewfinder and a touch-sensitive display screen.

BACKGROUND

For some years, digital cameras have become established in the market for recording photos and videos. While a light-sensitive film is used as the recording medium in conventional analog cameras, digital cameras acquire the images with the aid of an electronic image sensor. The digital image data generated by the image sensor are stored in a storage medium and can be further processed digitally.

Presently, digital cameras may be differentiated into two main types, namely the classic camera and the smartphone having a photo function.

In the classical digital camera, which has since also usually become capable of recording videos, the housing has an optical or electronic viewfinder, through which the user can observe the image to be recorded before the triggering. Since the eye of the user is in the immediate vicinity of the viewfinder in this case, no or only very little light reaches the viewfinder image from the outside. The user can therefore aim at a motif and determine the image detail without problems with the aid of the viewfinder even in dazzling sunlight or other bright conditions. In addition, a larger display screen is usually provided on the rear of the housing, by which the recorded images may be observed. If the digital camera has the so-called live view mode, the display screen can also be used instead of the viewfinder to determine the image detail.

The housing of classic cameras generally has multiple mechanical operating elements such as pushbuttons, adjustment wheels, or rocker buttons, by which the user can select particularly frequently used functions. The advantage of these mechanical operating elements is that the user can feel them with the fingers and operate them "blind", i.e., also while simultaneously using the viewfinder. Therefore, such cameras are widespread above all among (semi-)professional photographers. Less practiced users sometimes have difficulties in learning the mechanical operating elements, in contrast.

Smartphones, which have an installed optical unit and an image sensor, are increasingly becoming popular as a second type of digital cameras. The touch-sensitive display screen of the smartphone is exclusively used for aiming at the motif and determining the image detail. Since no mechanical operating elements are available for photography, the operation is exclusively performed with the aid of the graphic user interface of the smartphone, which is usually context-dependent. Therefore, only those functions which can be used in the respective context are offered to the user in the form of icons or other characters. Thus, for example, a volume controller only appears on the display screen when the smartphone is in the video recording mode.

Because of the context-dependent graphic user interface, smartphone cameras may be operated intuitively and are therefore beloved above all by non-professional users. For professional applications, smartphones have heretofore only been usable to a limited extent, which, in addition to the limited imaging properties of the optical unit, is also because no accessory parts such as external flash devices may be connected. Moreover, laypeople also perceive it to be a disadvantage that in dazzling sunlight, the image on the display screen can hardly be recognized.

For some time, digital cameras have been offered which attempt to combine the advantages of the classic cameras and of smartphones. In these digital cameras, the display screen on the rear of a classic camera housing is touch-sensitive, so that the digital camera can also be operated similarly to a smartphone.

For example, in the Samsung EK-GN120, the back of the housing is actually formed by a smartphone. The operation is primarily performed via an app based on the Android operating system. In addition to the trigger, there are only a few other mechanical operating elements. The icons displayed on the touch-sensitive display screen are not reproduced in the electronic viewfinder, however. The camera thus may only be operated with difficulty while the user observes the display screen of the electronic viewfinder.

The Nikon D5500 also has a similar functionality, the display screen of which can be angled and rotated. In the live view mode, the autofocus measuring field may be placed freely in the image by tapping the display screen. However, the live view via the display cannot be operated simultaneously with the optical viewfinder.

A digital camera is known from JP 2012-89973 A, in which not only an autofocus measuring field, but rather also icons for the program selection or a slide controller for setting the color saturation can be displayed in an electronic viewfinder. By way of tapping or pulling gestures on the touch-sensitive display screen, the user can select the corresponding functions or perform settings while he observes the display screen of the electronic viewfinder.

These known operating concepts have the disadvantage that the user cannot recognize while using the electronic viewfinder—in contrast to a smartphone—where his thumb or another finger is located above the touch-sensitive display screen. If he places the thumb anywhere "blindly" on the display screen, this can thus have the result, for example, that a setting is performed unintentionally.

DE 20 2014 006 401 U1 describes a digital camera having a touchscreen monitor on which virtual dials are displayed. The surface of the touchscreen monitor is provided with a haptically perceptible structure in the area of the displayed adjustment wheels. This structure may in particular be ribbed glass. This prevents a user from making unintentional changes by accidentally brushing over the virtual dials.

DE 10 2011 120 265 A1 relates to a digital camera including a touchscreen display and an electronic viewfinder. Haptic markings are arranged in the neighborhood of the touchscreen.

DE 11 2015 003 690 T5 relates to OLED displays, which may be designed on flexible substrates and can be touch-sensitive. A foldable, portable information terminal using such a flexible and touch-sensitive substrate is described. During the folding process, the touchscreen is bent.

DE 10 2011 012 838 A1 describes a method of providing a user interface in which an operating intention for manual operation of a control unit is detected. Depending on the detected operating intention, the haptic user surface changes from a first haptic condition to a second haptic condition. In this way, the haptic user interface can be controlled as required and adapted to the current user situation.

SUMMARY

It is an object of the disclosure is to provide a digital camera having an electronic viewfinder and a touch-sensitive display screen, in which the touch-sensitive display screen may be operated more easily while the user observes the display screen of the electronic viewfinder.

The object is achieved by a digital camera which has an electronic image sensor and an electronic viewfinder, which is configured to display images and/or videos acquired by the image sensor. The digital camera additionally has a display screen, which is also configured to display images and/or videos acquired by the image sensor. The display screen, which is independent of the electronic viewfinder and is bounded by a circumferential border, has a touch-sensitive surface, wherein a touch of the surface is recognizable in the electronic viewfinder. According to the disclosure, the display screen has a haptically perceptible structure, which is located inside the circumferential border (i.e., is not part of the border) and is designed so that a finger of a user can orient itself on the structure. The surface of the display screen has two planar sections which are arranged inclined in relation to one another, and the haptically perceptible structure is formed as a buckled edge, at which the two sections adjoin one another.

As already mentioned above, the control of a digital camera with the aid of a touch-sensitive display screen is difficult from the aspect of user-friendliness, since the user cannot see the display screen and his finger while he looks into the electronic viewfinder. The buckled edge according to the disclosure on the display screen offers a remedy here insofar as the finger of the user can orient itself on the buckled edge. The buckled edge can represent a reference line, which can be found intuitively by a finger of the user and from which the finger can be guided easily to other locations, without the user having to directly accompany these movements visually.

Providing a haptically perceptible structure formed by a buckled edge means turning away from the principle of designing touch-sensitive display screens to be as smooth and flat as possible. Normally, edges and other structures on touch-sensitive display screens are undesired, because different programs are generally executed on the relevant devices, which cannot take into consideration at which point an edge is located.

In the digital camera according to the disclosure, in contrast, the graphic user interface can adapt itself by software to the buckled edge. For example, multiple symbols can be displayed on the display screen, which are arrayed in succession along the buckled edge. The buckled edge then facilitates the "blind" moving down the symbols with the finger. A symbol is understood in this context to include not only icons, but rather also more complex graphic representations such as rotating or slide controllers.

If the digital camera has a trigger configured as a mechanical pushbutton, this is usually actuated by the index finger of the right hand of the user. The buckled edge on the display screen is then typically designed so that it can be felt by the thumb of the right hand of the user, while the user can actuate the trigger using the index finger of the right hand. Since the thumb is the most mobile finger of the human hand, the user can operate the touch-sensitive display screen particularly well therewith. If there is a model configured especially for left-handed people for the digital camera according to the disclosure, the buckled edge on the display screen can accordingly be designed so that it can be felt by the thumb of the left hand of the user.

In one exemplary embodiment, the buckled edge is at least substantially linear and extends in the vertical direction if an optical axis of the digital camera is aligned horizontally and the digital camera is oriented for recording an image in the transverse format. The user can then move along the buckled edge extending in the vertical direction particularly easily using the thumb or another finger. In the case of a buckled edge extending in the horizontal direction, it is generally less comfortable for the thumb to move along the edge.

This is advantageous above all if a section (typically extending in the vertical direction) is defined in the electronic viewfinder, in which symbols, which are linked to different functions of the digital camera, can be displayed vertically one below another depending on the present operating state of the digital camera. The user can then highlight the different symbols in succession by touching the display screen in a pulling movement at points located vertically one below another. The vertically extending buckled edge assists the finger of the user during these vertical movements over the display screen.

The operation is particularly comfortable for the user if he can move the thumb or another finger in the manner of a pulling movement over the touch-sensitive display screen, in order to highlight the different symbols in succession. The selection of a specific symbol can then be caused, for example, by a stronger pressure, by raising the finger, by a repeated touch after levering the finger from the display, or by an additional confirmation button to be pressed with another finger.

The different functions which are linked to the symbols displayed in the electronic viewfinder can include, for example:

a first function, upon the retrieval of which a menu opens, in which stored images and/or videos can be displayed, a second function, upon the retrieval of which the digital camera is put into a recording mode, in which images and/or videos can be recorded and in which particularly important settings such as exposure time, spot measurement or autofocus region or flash function can be set with the aid of the touch-sensitive surface, and a third function, upon the retrieval of which a menu opens, in which more rarely used settings can be changed.

In one exemplary embodiment, the user can retrieve a further submenu or a controller, from which a function or a value for a parameter can be selected by a pulling movement in the vertical direction, after he has highlighted a symbol, by way of a pulling movement on the display screen in the horizontal direction. The user can thus also perform more complex operating procedures such as the input of numeric values with the aid of the touch-sensitive display screen, while he simultaneously observes a motif through the electronic viewfinder or views images or videos already recorded by the digital camera.

In one exemplary embodiment, touch sensitivity of the touch-sensitive surface turned off only is at least one additional criterion, for example half-pressing the trigger or a zero signal from an acceleration sensor, is fulfilled. Thereby it is possible to avoid unintended change of settings during carrying or otherwise handling of the camera.

The surface of the display screen is divided into two sections by the buckled edge, to which different functions can be assigned in cooperation with the graphic user interface. Only forming one of the two sections as a touch-sensitive section, while the other section does not have a touch function, is also possible. The selection of touch-sensitive sections can optionally be synchronized with a proximity sensor, which detects when a user looks through the electronic viewfinder and switches off the presentation of content at the electronic display. For example, if the user looks through the electronic viewfinder, touch sensitivity may be turned off only in the first section of the display screen, while touch sensitivity is maintained in the second section of the display screen. In this manner, it is possible to prevent the user from unintentionally retrieving a function if his nose briefly touches the display screen. Furthermore, the graphic user interface can be embodied so that the symbols to be selected are arranged one below another along the buckled edge. If the user places his thumb or another finger in the buckled edge and moves along it, he can highlight symbols very conveniently and reliably and thus trigger functions or perform settings.

The touch-sensitive display screen ideally has a transparent pane, which is bent in the region of the buckled edge. In principle, however, having two partial display screens independent of one another abutting one another along the buckled edge also comes into consideration. The buckled edge is then formed by the adjacent edges of the adjoining partial display screens, which are located inside the circumferential border of the display screen.

In addition to the buckled edge, the surface of the display screen may have a substantially planar section, and an additional haptically perceptible structure is formed in the planar section as a protrusion, a depression or a microstructure having a haptically perceptible surface roughness. Such a protrusion or depression can be, for example, punctiform, linear, or ring-shaped. Furthermore, forming a complex structure pattern, on which the finger of the user can orient itself, with the aid of multiple individual structures separate from one another, the diameter of each of which is less than 2 millimeters (mm), also comes into consideration. Such a structure pattern can have the form of a straight or curved line, for example, or can consist of an arrangement of multiple lines.

For example, additional protrusions, recesses or other haptically perceptible structure formed within the touch-sensitive surface 20 of the display screen 18 may represent an image frame. Then a user's thumb may find additional orientation with this image frame. In particular, the outer lines may be represented by a line of haptically perceptible structures, and the image area may be divided in 9×9 smaller areas by additional dimples.

In spite of the improved operability of the touch-sensitive display screen as a result of the buckled edge, the digital camera according to the disclosure typically has multiple mechanical operating elements, using which at least two of the following functions can be set: exposure time, aperture opening, sensitivity, and automatic program. In this manner, practiced users can perform the most important settings very rapidly with the aid of the mechanical operating elements, without having to look away from the electronic viewfinder. The setting of specific parameters can also be performed in a hybrid manner in that only particularly frequently used parameters can be selected via the mechanical operating elements, while more rarely required parameters are only settable on the touch-sensitive display screen. Thus, for example, with the aid of a mechanical setting wheel, the most frequently used exposure times, for example between $\frac{1}{10}$ and $\frac{1}{1000}$ of a second, can be specified directly. Longer exposure times than $\frac{1}{10}$ of a second and shorter exposure times than $\frac{1}{1000}$ of a second may only be set via the touch-sensitive display screen, in contrast.

In addition, it may also be possible that the user retrieves a function, which requires the input of a parameter, by using a setting wheel, a pushbutton, a slide controller, a rocker, or another mechanical operating element. The input of the parameter is then performed with the aid of the touch-sensitive display screen. Thus, for example, a mechanical pushbutton can be actuated to set the sensitivity. A selection of available sensitivities is then displayed in the electronic viewfinder, from which the user makes a selection while using the touch-sensitive display screen. The buckled edge assists the user in this case in the above-described manner.

Also, the opposite order is possible and may be useful in certain instances. This means that the user first makes a gesture on the touch-sensitive display screen, and the final values are then selected using at least one mechanical operating element. For example, exposure compensation or setting the focus measurement area and the spot metering position may require an initial input on the touch-sensitive display screen, followed by an operation of a front wheel or another mechanical operating element. In other words, functions may generally be triggered by a combination of a user gesture on the touch-sensitive surface and an operation of at least one of the mechanical operating elements.

BRIEF DESCRIPTION OF THE DRAWINGS

The disclosure will now be described with reference to the drawings wherein.

DESCRIPTION OF EXEMPLARY EMBODIMENTS

1. First Exemplary Embodiment—Structure

Figure 1:
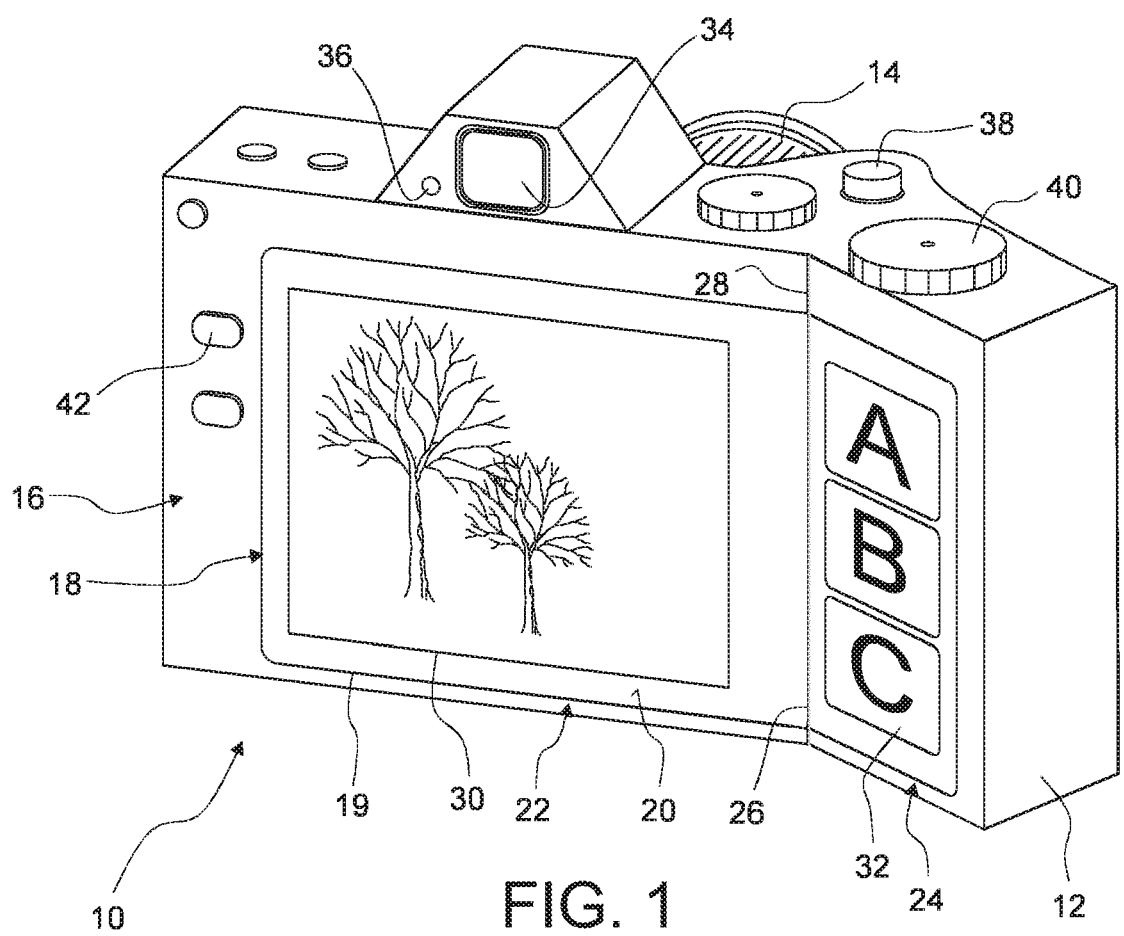
FIG. 1 shows a perspective view of a digital camera according to a first exemplary embodiment of the disclosure, in which a haptically perceptible structure is formed as a buckled edge, at which two sections of a touch-sensitive display screen adjoin one another.

FIG. 1 shows a perspective view of a digital camera, which is designated as a whole with 10, according to a first exemplary embodiment of the disclosure. The digital camera 10 has a housing 12, on which an objective lens 14 is replaceably fastened on the front side thereof facing away from the observer. In other exemplary embodiments, the objective lens 14 is non-replaceably connected to the housing 12.

A display screen 18, which has a circumferential border 19 and a touch-sensitive surface 20, is incorporated into the rear wall 16 of the housing 12 facing towards the observer in FIG. 1. The surface 20 is divided into a first planar section 22 and a second planar section 24 which is arranged inclined in relation thereto. The second section 24 is inclined in this case relative to the first section 22 by a buckling angle, which is typically between 15° and 45° and is approximately 25° in the illustrated exemplary embodiment. The two sections 22 and 24 adjoin one another along a buckled edge 26, which is flush with a housing buckled edge 28 and is located inside the border 19.

In the illustrated operating state of the digital camera 10, an image 30, which has been previously recorded by the digital camera 10, is shown in the first section 22 of the display screen 18. Three icons 32, which are associated with functions A, B, and C, are shown one below another in the second section 24 of the display screen 18.

The digital camera 10 has an electronic viewfinder 34 arranged on the upper side of the housing 12, using which a user can aim at a motif and can determine the image section. The electronic viewfinder 34 is constructed like conventional electronic viewfinders and contains a small high-resolution display screen, which is imaged into infinity by an optical unit, which can be configured, for example, as a Galileo telescope. The user can thus perceive a virtual and enlarged image of the small viewfinder display screen when looking through the ocular of the electronic viewfinder 34. With the aid of a proximity sensor 36, which is located directly adjacent to the electronic viewfinder 34, the digital camera 10 can determine whether the user is using the electronic viewfinder 34 or not. It can be made dependent thereon whether the viewfinder display screen of the electronic viewfinder 34 and the display screen 18 on the rear side 16 of the housing 12 are turned on or off, as is known per se in the related art. As a contribution to conventional control schemes, the touch sensitivity is turned off in the first section 22 of the display screen 18, while the touch sensitivity is fully maintained in the second section 24 even if the proximity sensor 36 detects the presence of the user's head. Then the user may still select one of the functions A, B, or C represented by the icons 32 that are displayed in the second section 24, or may perform any other user input using a touch gesture, as this will be described in more detail below. However, the user is not able to trigger any function inadvertently if his head touches the first section 22 of the display screen 18.

The housing 12 additionally has multiple mechanical operating elements, among them a trigger 38, a program setting wheel 40, and multiple pushbuttons 42, using which frequently used functions can be triggered and particularly important settings can be performed.

Figure 2:
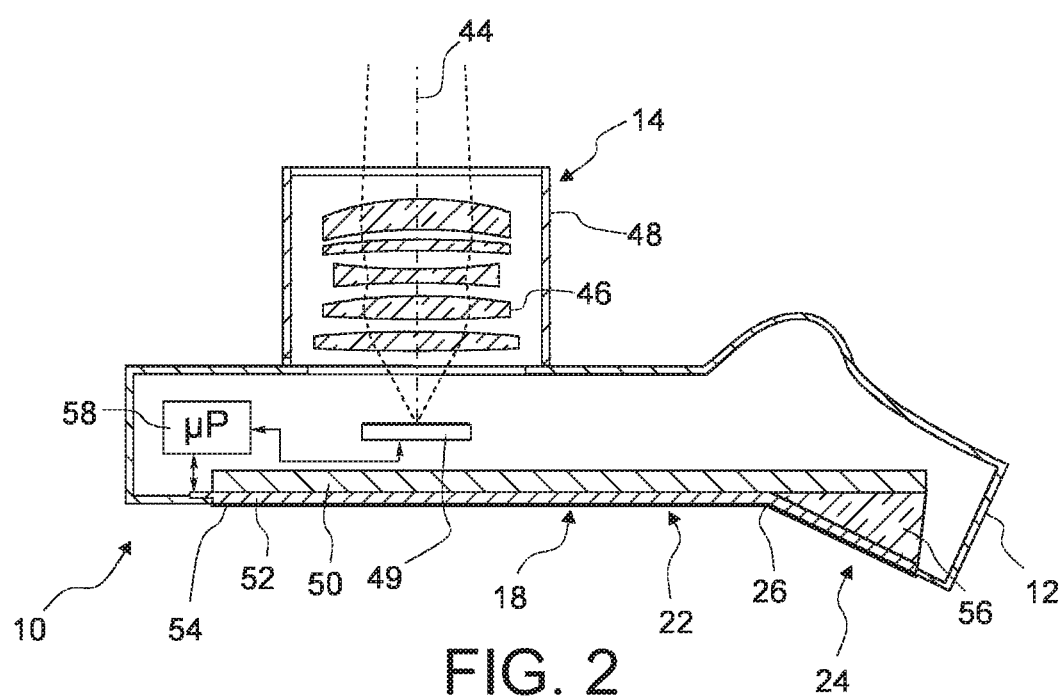
FIG. 2 shows a horizontal section through the digital camera shown in FIG. 1.

FIG. 2 shows the digital camera 10 in a simplified horizontal section at the height of the optical axis 44 of the objective lens 14. Multiple lenses 46 of the objective lens 14, which are accommodated in an objective lens housing 48, are schematically shown in the sectional view. An electronic image sensor 49, which has a regular two-dimensional arrangement of light-sensitive cells, is located in the beam path of the objective lens 14.

It can be seen in the sectional view shown in FIG. 2 that the display screen 18 has an LCD panel 50, which is not buckled. In the illustrated exemplary embodiment, the touch-sensitive surface 20 of the display screen 18 is formed by a resistive touchscreen, which includes a glass pane 52 and an outer polyester layer 54 supported thereby. The polyester layer 54 is separated from the glass pane by small spacers, as is known per se in the related art. The surfaces of the glass pane 52 and the polyester layer 54 facing towards one another are coated using indium tin oxide, so that an electrical connection is established when the outer polyester layer 54 is pressed by a finger or another object against the glass pane 52. Of course, the touch-sensitive display screen 18 can also be implemented as a capacitive touchscreen. However, in that case the user cannot wear gloves to operate the touch-sensitive display screen 18.

As can be seen in FIG. 2, the glass pane 52 of the display screen 18 is bent along the buckled edge 26. A wedge-shaped intermediate space, which is filled using silicone 56, thus results between the angled part of the glass pane 52, which defines the second section 24 of the display screen 18, and the non-angled LCD panel 50. The icons 32 displayed by the LCD panel 50 in the region of the second section 24 thus remain visible through the wedge made of silicone 56, the glass pane 52, and the polyester layer 54.

The image sensor 49 and the display screen 18 are connected to a control unit 58, which controls all functions of the digital camera 10. The control unit 58 is responsible in particular for the processing of the signals supplied by the image sensor 49, the determination of the content to be displayed on the LCD panel 50, and the processing of the inputs of the user with the aid of the touch-sensitive display screen 18 and of the mechanical operating elements such as trigger 38, setting wheel 40, and pushbuttons 42. In addition, the control unit 58 controls the actuators provided in the digital camera and determines the content to be displayed in the electronic viewfinder 34. The control unit 58 can have multiple individual subunits for this purpose, which are separated from one another with respect to hardware.

2. First Exemplary Embodiment—Function

The function of the digital camera 10 shown in FIGS. 1 and 2 will be explained in greater detail hereafter with reference to FIGS. 3 to 8.

Figure 3:
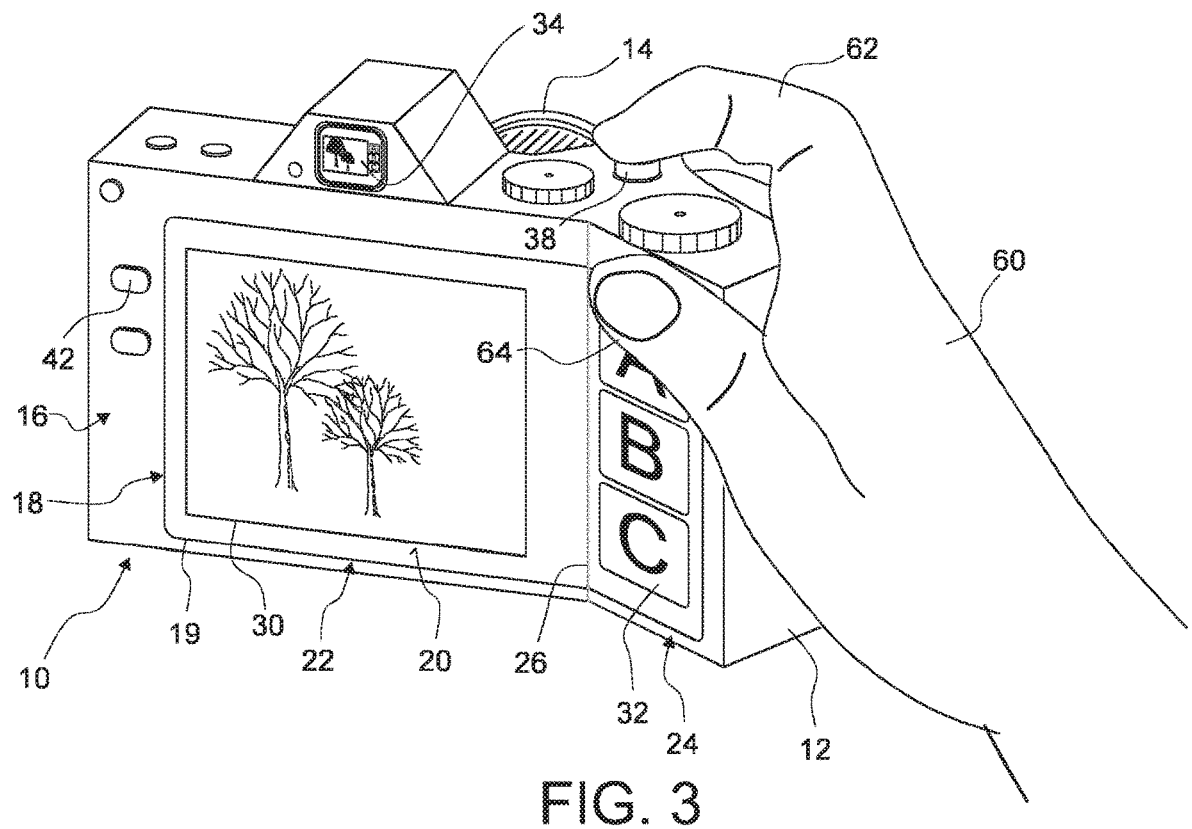
FIG. 3 shows the digital camera shown in FIG. 1 during the operation in the recording mode.

FIG. 3 shows the digital camera 10, while it is held by the hand 60 of a user. In general, the user will additionally support the digital camera 10 with his left hand, for example below the objective lens 14. In principle, however, the digital camera 10 can also be held, and essential functions thereof can be operated, solely with the right hand 60. The angled part of the housing 12 is clamped for this purpose between the palm and the ball of the thumb of the hand 60, so that the index finger 62 can actuate the trigger 38. The thumb 64 of the hand 60 may then be moved comfortably over the second section 24 of the display screen 18 in the vertical direction. It is presumed hereafter that the user looks with one eye into the electronic viewfinder 34. Since the head of the user is then located directly in front of the rear side 16 of the housing 12, the head of the user is not shown in FIG. 3.

Figure 4:
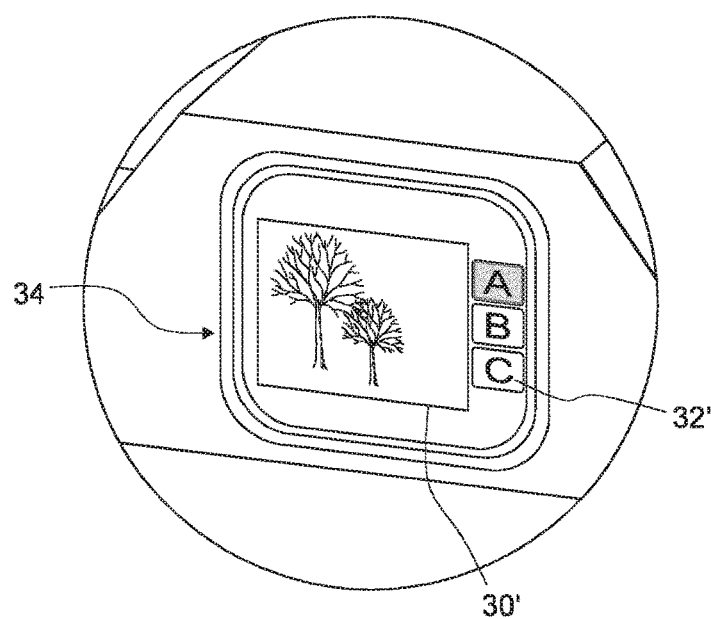
FIG. 4 shows an enlarged detail from FIG. 3, in which the display shown in an electronic viewfinder of the digital camera is recognizable.

FIG. 4 shows the content of the viewfinder display screen, which the user observes when looking into the electronic viewfinder 34. Essentially the entire graphic user interface of the display screen 18 on the rear side 16 of the housing 12 is shown. The user can therefore also recognize the last recorded image 30' and the icons 32' in the electronic viewfinder 34. To make this content differentiable from the content displayed on the display screen 18, the relevant reference numerals are provided with an apostrophe.

If the thumb 64 of the user touches the icon associated with the function A, this is thus highlighted in the electronic viewfinder 34, which is indicated in FIG. 4 by a darker colour. If the thumb 64 now strokes vertically downward in a pulling movement, the icons 32' associated with the other functions B and C are thus successively highlighted in a corresponding manner. To trigger the function linked to an icon, various operating concepts can be implemented. For example, having the thumb 64 rest beyond a certain duration on the relevant icon on the second section 24 of the display screen 18 comes into consideration. Another possibility for triggering the function is to briefly raise the thumb 64. Depending on the technology used for the touch-sensitive surface 20, strengthening the pressure can also cause triggering of the function.

If the user is to select not only between the functions A to C, but rather between further functions, the graphic user interface can thus be designed so that the image detail shown in the second section 24 of the display screen 18 is scrolled upwards as soon the thumb 64 reaches the lower end of the second section 24. However, such a scrolling movement can also be triggered by a wiping movement of the thumb 64 over the second section 24, or a separate control wheel of the camera, as is known per se in the related art.

As a result of the angled arrangement of the second section 24 in relation to the first section 22 of the display screen 18, the user can orient himself easily with his thumb 64 on the touch-sensitive display screen 18, while the user looks in the electric viewfinder 34. The buckled edge 26, which separates the two sections 22, 24 from one another, is easily haptically perceptible to the thumb 64 of the user. The thumb 64 thus finds the starting position shown in FIG. 3 "blind", i.e., without the user having to observe his thumb 64. The icons 32' can be arranged in this case so close to the buckled edge 26 that the thumb 64 always touches the buckled edge 26 during the vertical up-and-down movement to select the functions A to C, and is therefore guided thereby in the vertical direction.

The functions A to C, which are associated with the icons 32, can be, for example, the following three basic functions of the digital camera 10:

A library function A, upon the retrieval of which a menu opens, in which stored images and/or videos can be loaded from a library and displayed.

A recording function B, upon the retrieval of which the digital camera 10 is put into a recording mode, in which images and/or videos can be recorded. The images acquired by the image sensor 49 are then immediately displayed in the electronic viewfinder 34 and on the display screen 18 and can be stored by actuating the trigger 38. In the recording mode, the particularly important settings such as exposure time or flash function can be set by using the second section 24 of the touch-sensitive display screen 18. Some or all of these important settings can alternatively be performed by the user with the aid of the mechanical operating elements, i.e., the setting wheel 40 or the pushbutton 42. It may also be envisaged to set certain settings by combining user gestures with an operation of the mechanical operating elements.

A setting function C, upon the retrieval of which a menu opens, in which more rarely used settings can be changed.

Figure 5:
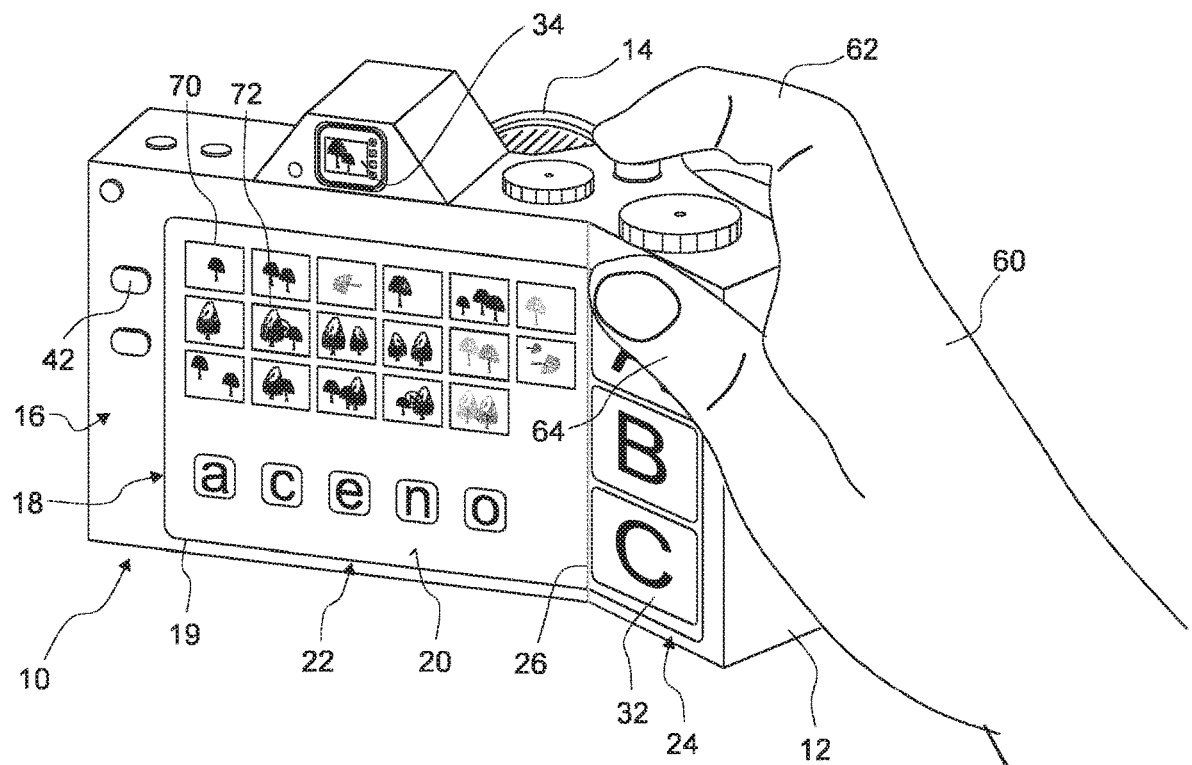
FIG. 5 shows the digital camera shown in FIG. 1 during operation in the library mode.
Figure 6:
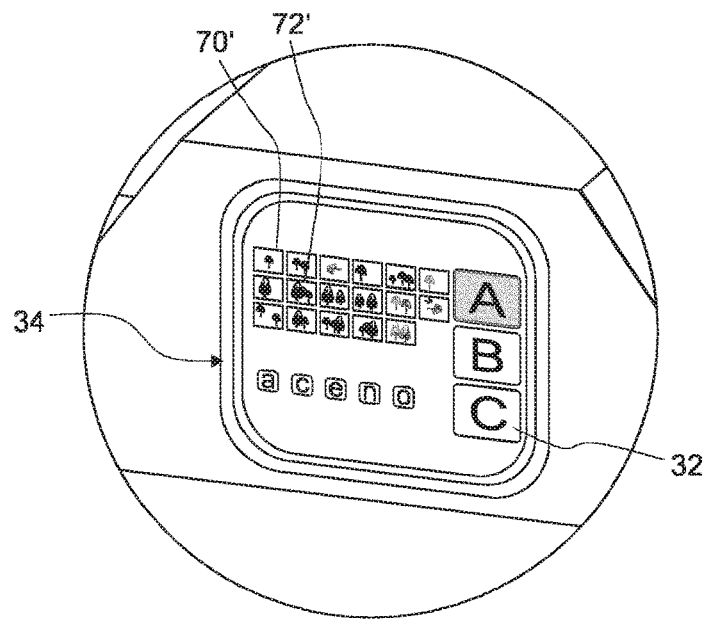
FIG. 6 shows an enlarged detail from FIG. 5, in which the display shown in the electronic viewfinder is recognizable.

FIGS. 5 and 6 illustrate, by way of example, the display on the display screen 18 and the electronic viewfinder 34, which is obtained upon selection of the library function A. The recorded images 70 and videos 72 appear in the first section 22 of the display screen 18 and can be shown enlarged by touching the corresponding locations on the display screen 18. To be able to navigate in the first section 22 of the display screen 18, the location of the thumb 64 on the icon A, which is displayed in the second section 24, can be interpreted as the cursor position. The user can thus also then select the images 70 and videos 72 when he looks into the electronic viewfinder 34 and cannot reach the first section 22 of the display screen 18 with his thumb 34 or can only do so with difficulty.

Figure 7:
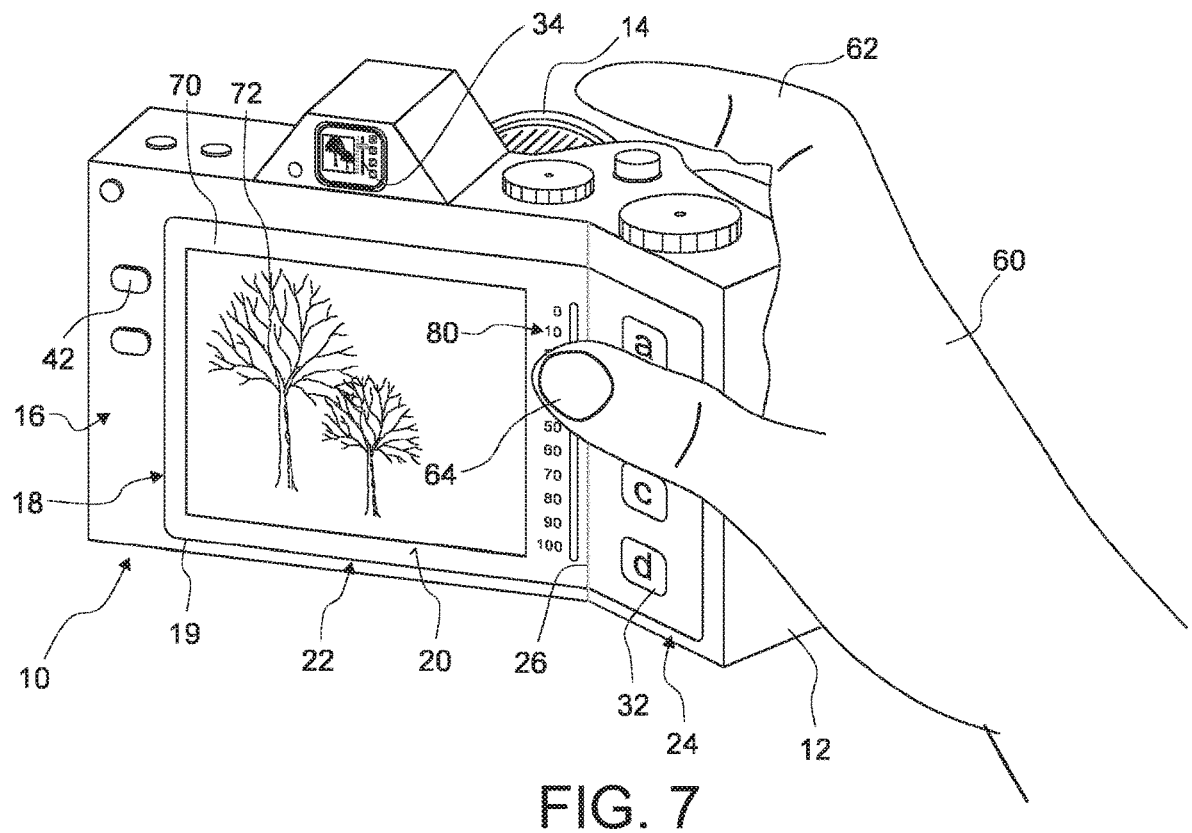
FIG. 7 shows the digital camera shown in FIG. 1 during the operation in the setting mode.
Figure 8:
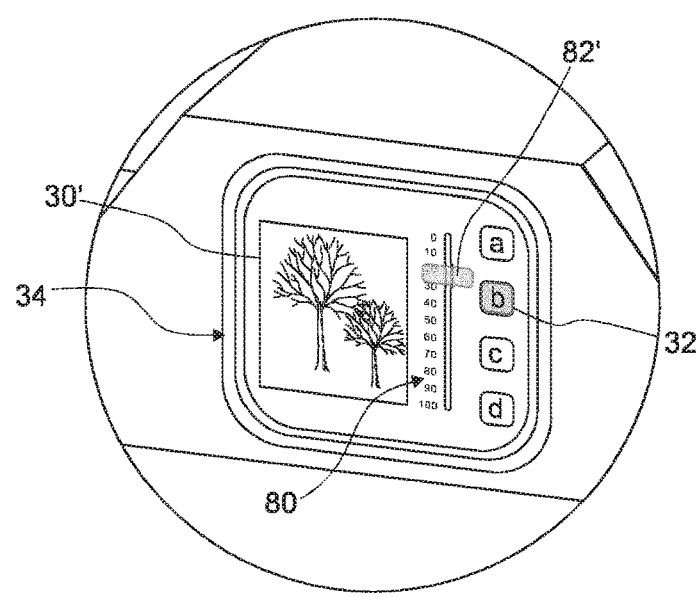
FIG. 8 shows an enlarged detail from FIG. 5, in which the display shown in the electronic viewfinder is recognizable.

The displays shown by way of example in FIGS. 7 and 8 on the display screen 18 and the electronic viewfinder 34 were obtained after retrieval of the setting function C. A submenu is recognizable, using which parameters for settings a, b, c, and d may be determined. After selection of the setting b, an additional slide controller was overlaid, which is movable in the vertical direction over a scale 80 having values between 0 and 100 for the parameter of the setting b. In FIG. 7, the slide controller is covered by the thumb 64; in the electronic viewfinder 34, it is identified with the reference number 82'.

To operate the slide controller 82', the user guides his thumb 64 after the selection of the setting b in the horizontal direction over the second section 24 of the display screen 18 to the left, until the thumb 64 passes over the buckled edge 26. Upon touching the buckled edge 26, the slide controller 82' is overlaid, as is recognizable in the display on the electronic viewfinder 34 of FIG. 8. By way of a vertical pulling movement, the user can now guide the slide controller 82' to the desired vertical position with the aid of his thumb 64 and assume the corresponding parameters by way of a suitable gesture. Similarly, as in the selection of the menu functions A to C, for example, a longer pause on the corresponding position, increased pressure, raising, or raising followed by touching again come into consideration as gestures. The buckled edge 26 also assists the user here in finding the scale 80 using the thumb 64, without having to observe the thumb 64 in this case.

3. Second Exemplary Embodiment

Figure 9:
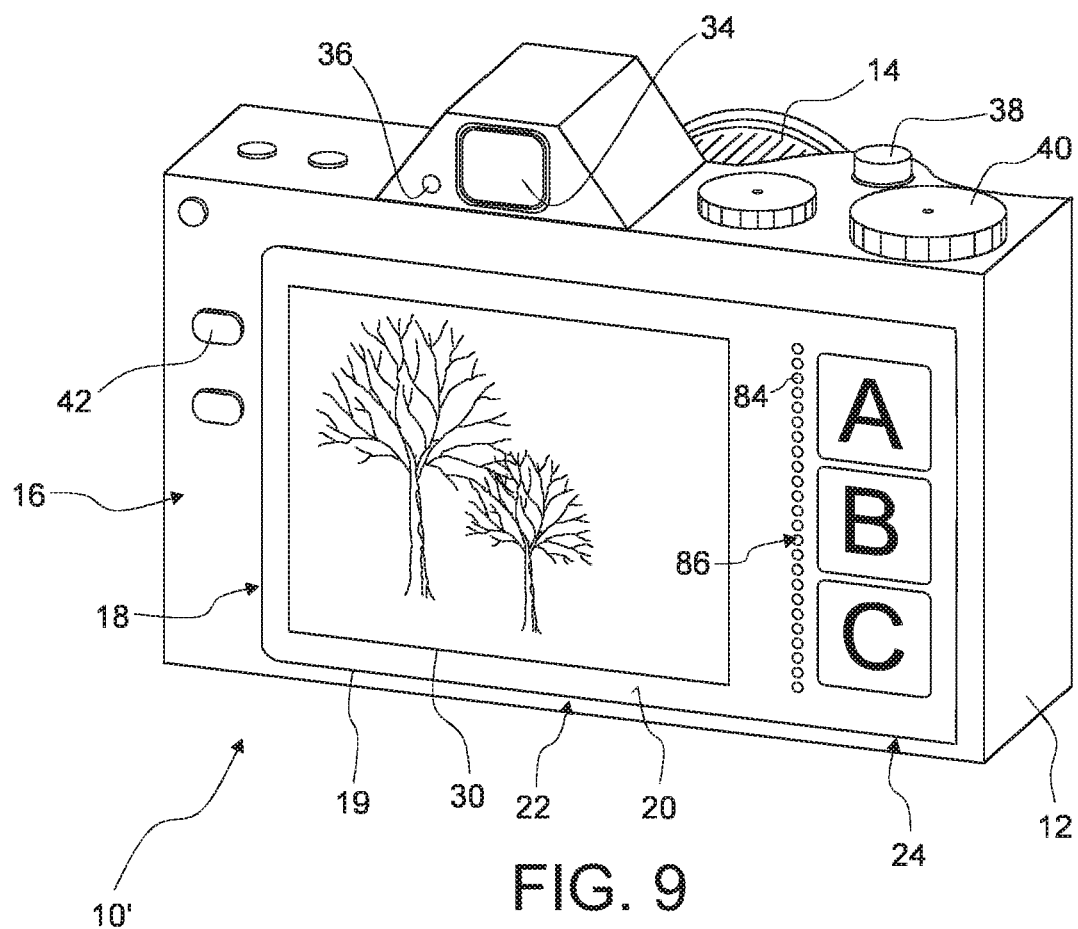
FIG. 9 shows a perspective illustration of a digital camera according to a second exemplary embodiment of the disclosure, in which a haptically perceptible structure is formed by a row of punctiform elevations on the touch-sensitive display screen.
Figure 10:
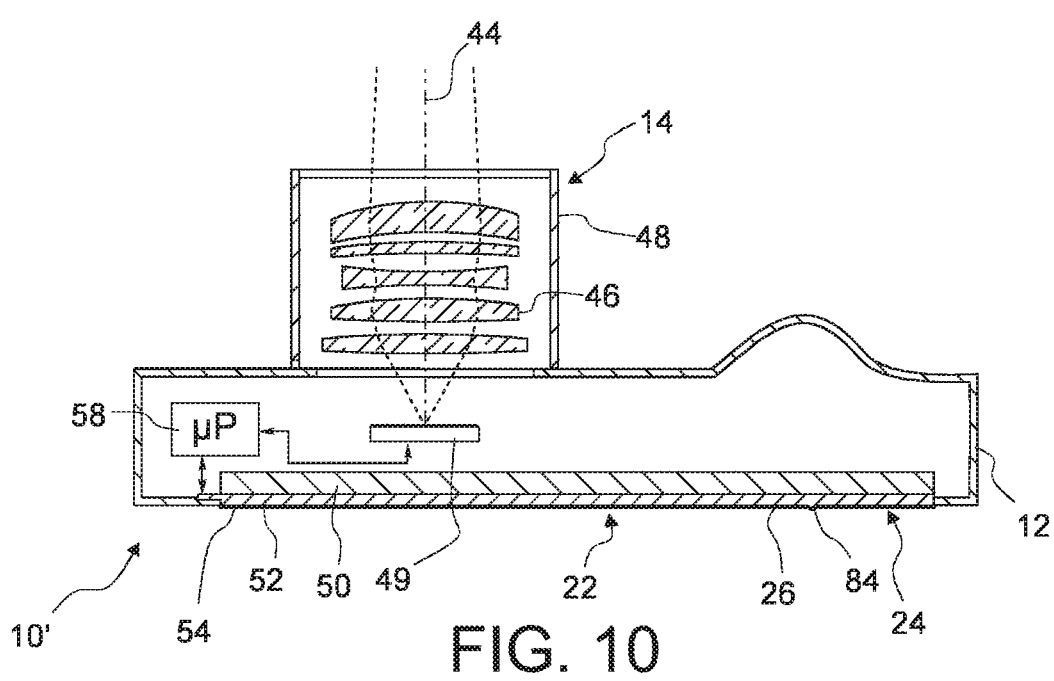
FIG. 10 shows a horizontal section through the digital camera shown in FIG. 9.

FIGS. 9 and 10 show a digital camera 10' according to a second exemplary embodiment of the disclosure in a perspective view and in a horizontal section, respectively.

The digital camera 10' shown in FIG. 9 also has a touch-sensitive display screen 18, which is divided into a first section 22 and a second section 24. The two sections 22 and 24, in contrast to the first exemplary embodiment, are not arranged inclined in relation to one another, however, but rather extend in a plane. The two sections 22 and 24 are separated in the second exemplary embodiment by a haptically perceptible structure, which is formed by an arrangement of small protrusions 84 in the surrounding planar section. Alternatively, also depressions or both are possible. These protrusions 84 are arranged closely spaced apart from one another along a vertically extending line 86. The thumb 64 of the user can orient itself on this line 86 in a similar manner as on the buckled edge 26 in the digital camera 10 according to the first exemplary embodiment.

Otherwise, the function and operation of the digital camera 10' shown in FIGS. 9 and 10 do not differ from the digital camera 10 according to the first exemplary embodiment.

4. Third Exemplary Embodiment

Figure 11:
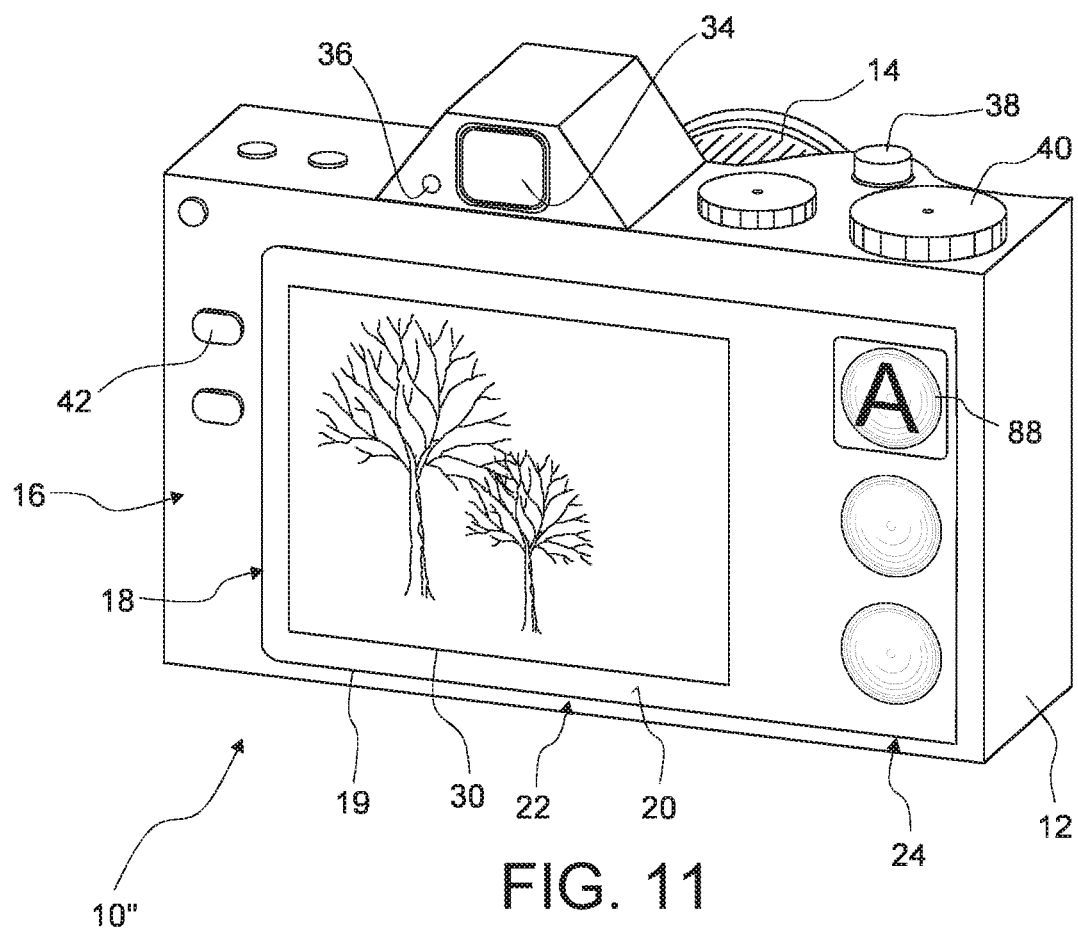
FIG. 11 shows a perspective view of a digital camera according to a third exemplary embodiment of the disclosure, in which haptically perceptible structures are formed by recessed grips in the touch-sensitive display screen.
Figure 12:
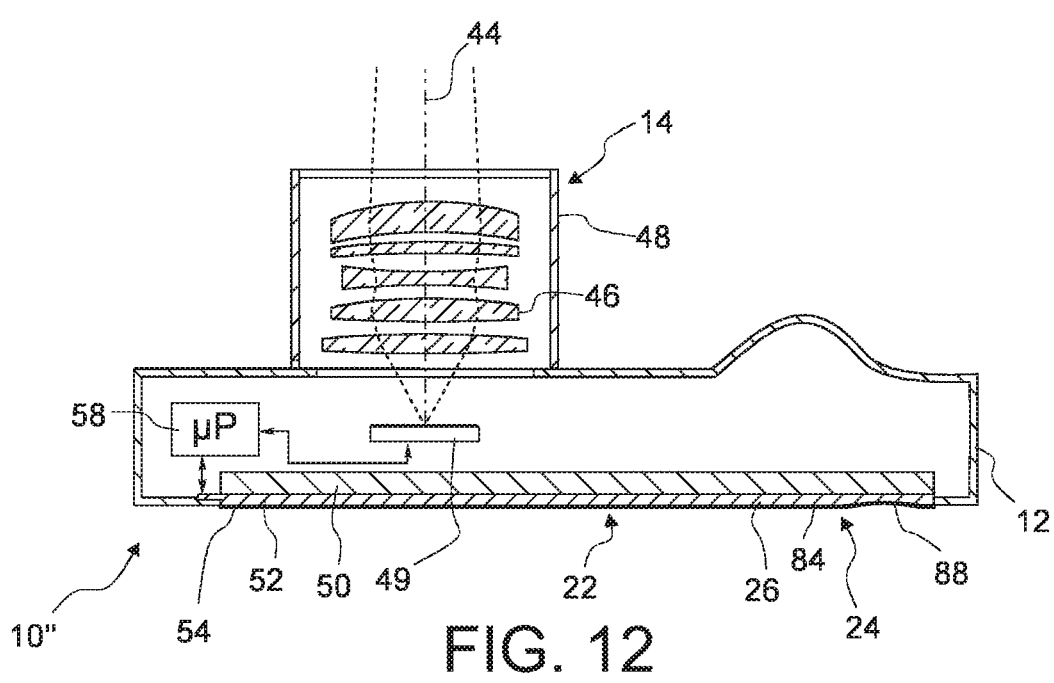
FIG. 12 shows a horizontal section through the digital camera shown in FIG. 11.

FIGS. 11 and 12 show a digital camera 10" according to a third exemplary embodiment of the disclosure in a perspective view and in a horizontal section, respectively.

In the digital camera 10", haptically perceptible structures are not formed by protrusions, but rather by larger depressions 88 in the surrounding planar section, which form recessed grips for the thumb 64 of the user. In this manner, the user can find the positions at which the icons 32 for the functions A to C are displayed "blind", i.e. while he observes the electronic viewfinder 34, using the thumb 64 of his hand 60 (only the icon associated with the function A is shown in FIG. 11 for reasons of comprehensibility).

Otherwise, the function and operation of the digital camera 10" shown in FIGS. 11 and 12 do not differ from the digital camera 10 according to the first exemplary embodiment.

5. Further Exemplary Embodiments

Ideally, all or at least some of the operations that are accessible through the touch-sensitive surface 20 can be configured by the user in a setup menu. The camera may also provide typical operation controls depending on the shooting conditions. For example, in a dark environment the camera may provide the flash menu or high ISO settings. For scenes with high dynamic range, the camera might automatically provide tone mapping or HDR settings. Depending on the daytime, the camera may automatically provide a change of setting of the white balance.

The operation of the camera via gesture control can be set to generally overrule settings that have been accomplished with the help of control wheels, buttons or other hardware elements. For example, subject to the preference of the user, the input via a touch gesture might overrule an ISO setting of an ISO wheel of the camera.

Other operations, but not limited to those, accessible with the touch-sensitive area can for example be:

standard controls such as releasing, shutter speed, ISO setting, white balance, aperture control, flash control, metering modes for exposure and/or autofocus;

position and size of metering areas for exposure and/or autofocus;

control of image format, image size, and rotation of an image;

adding or editing of guiding lines, grids, frames, or "golden-rules" for assistance and orientation of image framing;

selection of special imaging methods like panorama, tone mapping or HDR;

post-processing operations such as filter modes, color controls, and apodization control;

adjustment of perspective distortion; and rating, tagging, and sorting of images.

It is understood that the foregoing description is that of the exemplary embodiments of the disclosure and that various changes and modifications may be made thereto without departing from the spirit and scope of the disclosure as defined in the appended claims.

What is claimed is:

1. A digital camera comprising:
    an electronic image sensor;
    an electronic viewfinder configured to display images and/or videos acquired by the electronic image sensor;
    a display screen configured to display the images and/or the videos acquired by the electronic image sensor, the display screen:
        being independent of the electronic viewfinder,
        being bounded by a circumferential border,
        having a touch-sensitive surface, wherein a touch of the touch-sensitive surface is recognizable in the electronic viewfinder, and
        having a haptically perceptible structure located inside the circumferential border and being configured such that a finger of a user can orient itself on a structure,
    the touch-sensitive surface of the display screen having two planar sections arranged inclined relative to one another; and
    the haptically perceptible structure being formed as a buckled edge, at which the two sections adjoin one another.

2. The digital camera according to claim 1, further comprising:
    a trigger configured as a mechanical pushbutton, and
    the buckled edge being configured such that it can be felt by a thumb of a right hand of the user while the user actuates the trigger using an index finger of the right hand.

3. The digital camera according to claim 1, wherein the buckled edge is at least substantially linear and extends in a vertical direction if an optical axis of the digital camera is aligned horizontally and the digital camera is oriented for recording an image in a transverse format.

4. The digital camera according to claim 1, wherein:
    a section is defined in the electronic viewfinder, in which symbols, which are linked to different functions of the digital camera, can be displayed vertically one below another depending on a present operating state of the digital camera, and
    different symbols can be highlighted in succession by the user touching the display screen in a pulling movement at points located vertically one below another.

5. The digital camera according to claim 4, wherein the different functions comprise:
    a first function, upon a retrieval of which a menu opens, in which the images which are stored and/or the videos which are stored can be displayed,
    a second function, upon the retrieval of which the digital camera is put into a recording mode, in which the images and/or the videos can be recorded, and
    a third function, upon the retrieval of which the menu opens, in which settings can be changed.

6. The digital camera according to claim 4, wherein a further submenu or a controller, from which a function or a value for a parameter can be selected by the pulling movement in a vertical direction, is retrievable by the user, after the user has highlighted a symbol, by the pulling movement on the display screen in a horizontal direction.

7. The digital camera according to claim 1, further comprising:
    a proximity sensor configured to detect a presence of a user's head when the user looks through the electronic viewfinder, and
    wherein, if the user looks through the electronic viewfinder, touch sensitivity is turned off in a first section of the display screen, and the touch sensitivity is maintained in a second section of the display screen.

8. The digital camera according to claim 1, wherein the display screen includes a transparent pane bent in a region of the buckled edge.

9. The digital camera according to claim 1, wherein the touch-sensitive surface of the display screen includes a substantially planar section, and an additional haptically perceptible structure is formed in a planar section as a protrusion, a depression or a microstructure having a haptically perceptible surface roughness.

10. The digital camera according to claim 1, further comprising:
   a plurality of mechanical operating elements by which at least two of a following functions can be set: exposure time, aperture opening, sensitivity, and automatic program.

11. The digital camera according to claim 10, wherein at least some camera functions are triggered by a combination of a user gesture on the touch-sensitive surface and an operation of at least one of mechanical operating elements.

* * * * *